United States Patent
Schaffner, Jr. et al.

(10) Patent No.: US 8,790,912 B2
(45) Date of Patent: Jul. 29, 2014

(54) **COMPOSITION FOR ENHANCING ANAEROBIC REDUCTIVE DECHLORINATION BY *DEHALOCCOIDES***

(76) Inventors: Ivan Richard Schaffner, Jr., Goffstown, NH (US); Kent C. Armstrong, Andover, NH (US)

(*) Notice: Subject to any disclaimer, the term of this patent is extended or adjusted under 35 U.S.C. 154(b) by 0 days.

(21) Appl. No.: 13/322,699

(22) PCT Filed: May 28, 2010

(86) PCT No.: PCT/US2010/036512
§ 371 (c)(1),
(2), (4) Date: Nov. 28, 2011

(87) PCT Pub. No.: WO2010/138786
PCT Pub. Date: Dec. 2, 2010

(65) Prior Publication Data
US 2012/0070882 A1    Mar. 22, 2012

Related U.S. Application Data

(60) Provisional application No. 61/182,269, filed on May 29, 2009.

(51) Int. Cl.
*C12N 1/20* (2006.01)
*A62D 3/00* (2006.01)
*A62D 3/02* (2007.01)
*B09B 3/00* (2006.01)
*B09C 1/10* (2006.01)

(52) U.S. Cl.
USPC ..................... 435/253.6; 435/262.5

(58) Field of Classification Search
None
See application file for complete search history.

(56) References Cited

U.S. PATENT DOCUMENTS

| | | | | |
|---|---|---|---|---|
| 5,158,595 A | * | 10/1992 | Stillman | 71/64.1 |
| 5,302,285 A | * | 4/1994 | Attaway et al. | 210/605 |
| 5,587,317 A | * | 12/1996 | Odom | 435/262.5 |
| 2002/0090697 A1 | * | 7/2002 | Hince | 435/187 |
| 2004/0177664 A1 | | 9/2004 | Hale | |
| 2009/0111156 A1 | | 4/2009 | Uemoto et al. | |

OTHER PUBLICATIONS

Smatlak et al., Environ. Sci. Technol., 30:2850-2858, 1996.*
Information of Brewer's yeast, from he University of Maryland Medical Center, retrieved on Jun. 11, 2013 from the internet: http://www.umm.edu/altmed/articles/brewers-yeast-000288.htm.*
Attaway et al. Journal of Industrial Microbiology, 12:408-412, 1993.*
He et al., Applied and Environmental Microbiology, 73:2847-2853, 2007.*
Holliger et al., Applied and environmental microbiology, 59:2991-2997, 1993.*
International Search Report and Writtne Opinion PCT/US10/36512; dated Jul. 21, 2010.

* cited by examiner

*Primary Examiner* — Jennifer McDonald
*Assistant Examiner* — Qing Xu
(74) *Attorney, Agent, or Firm* — Tarolli, Sundheim, Covell & Tummino L.L.P.

(57) ABSTRACT

The composition comprises, by mass, about: 52% Lactose, 15.2% B12-fortified Brewer's Yeast, 12% Sodium Proponate, 0.8% Sodium carbonate, 0.12% Nitrate Nitrogen, 2.1% Ammoniacal Nitrogen, 3.78% Urea Nitrogen, 1% Available Phosphoric Acid, 0.4% Soluble Potash ($K_2O$), 2% Sulphur (S), 0.0064% Iron, 0.0066% Manganese, 0.0036% Zinc, 0.00068% Copper, 0.003% Boron and about 0.0068% Molybdenum.

2 Claims, 3 Drawing Sheets

| ANALYTE | Sump 1 Additive: HRC | | | | | |
|---|---|---|---|---|---|---|
| | 4/8/2008 | 1/2/2009 | 2/26/2009 (No Purge) | 2/26/2009 | 4/6/2009 (No Purge) | 4/6/2009 |
| Temperature (°C) | 7.7 | 8.6 | 6.7 | 8.3 | 7.9 | 7.9 |
| pH | 6.8 | 6.5 | 4.4 | 5.6 | 6.7 | 7.6 |
| Specific Conductance µS/cm | 1440 | 966 | 734 | 796 | 1250 | 1250 |
| Dissolved Oxygen Mg/l | 0 | 0.5 | 3.74 | 1.08 | 0.51 | 0 |
| eH (mV) | -74 | 112 | -59 | -169 | -159 | -254 |
| Methane (µg/l) | NM | 132 | Not sampled | 74.6 | .135 | 185 |
| Ethane (µg/l) | NM | 13.5 | | 7.98 | 11.9 | 14.8 |
| Ethene (µg/l) | NM | 45.8 | | 14.9 | 22.3 | 23.9 |
| Chloride mg/l | NM | 17.4 | | 16.0 | 13.4 | 14.7 |
| Nitrogen, Nitrate (mg/l) | NM | 0.050U | | 0.050U | 0.050U | 0.050U |
| Sulfate (mg/l) | NM | 174 | | 136 | 148 | 158 |
| Total organic carbon (mg/l) | NM | 6.5 | | 252 | 31.5 | 13.2 |
| Iron (µg/l) | NM | 2510 | | 4710 | 560 | 2,480 |
| Manganese (µg/l) | NM | 399 | | 329 | 373 | 377 |
| cVOC Compounds | | | | | | |
| cis-1,2-Dichloroethene (µg/l) | NS | 11400 | | 7870 | 7940 | 6,200 |
| Trichlorethene (µg/l) | NS | 15400 | | 275 | <32 | 419 |
| Vinyl Chloride (µg/l) | NS | 1290 | | 952 | 830 | 845 |
| Total VOCs (µg/l) | NS | 28090 | | 9097 | 8770 | 7464 |
| Comments | | No odor, water clear | Strong odor, water opaque, approx one half of additive remains | Strong odor, water opaque, approx one half of additive remains | Water has gray color, organic and TCE odor, approx 10% of additive remains | Water has gray color, organic and TCE odor, no effervescene in purge water, approx 10% of additive remains |
| Molar Parent Ratio | | 55 | | 3.0 | 0.2 | 5.6 |
| Change in Parent Ratio from Baselines (molar basis) | | | | 94.5% | 99.7% | 89.8% |
| Change in Total VOC Concentration from Baseline (mass basis) | | | | -67.6% | -68.8% | -73.4% |

Notes:
1. Data collected on April 28, 2008
2. "U" indicates compound was not present above the method detection limit indicated.
3. "J" indicates a result greater than or equal to the method detection limit (MDL), but less than the reporting limit
4. Additives deployed on January 12, 2009. For more information on the additives, refer to the text.
5. Methylene chloride deducted from total VOC value – assumed laboratory artefact
6. Approximately one-half of the original additive volume remain as of the 2/26/209 sampling event.
7. (No Purge) implies the sump was not purged (low flow) prior to the collection of the sample.
8. Purged samples reflect approximately 2.5 gallons purged from sump using low-flow techniques.
9. cVOCs indicates chlorinated volatile organic compounds.

Fig.1

| ANALYTE | Sump 2 Additive:EDC | | | | |
|---|---|---|---|---|---|
| | 11/6/2008 | 2/26/2009 (No Purge) | 2/26/2009 | 4/6/2009 (No Purge) | 4/6/2009 |
| Temperature (°C) | 15.1 | 9.0 | 9.4 | 6.7 | 6.5 |
| pH | 6.2 | 6.7 | 6.7 | 6.9 | 6.9 |
| Specific Conductance µS/cm | 920 | 752 | 775 | 1120 | 1100 |
| Dissolved Oxygen Mg/l | 3.8 | 3.32 | 1.05 | 0.21 | 0.00 |
| eH (mV) | NM | -228 | -251 | -200 | -227 |
| Methane (µg/l) | 103 | Not sampled | 91.7 | 54.9 | 34.2 |
| Ethane (µg/l) | 10.8 | | 5.09 | 6.02 | 3.89 |
| Ethene (µg/l) | 10.4 | | 8.61 | 8.76 | 4.71 |
| Chloride mg/l | 16.4 | | 11.4 | 10.6 | 9.5 |
| Nitrogen, Nitrate (mg/l) | 0.14 | | 0.050U | 1.1 | 0.16 |
| Sulfate (mg/l) | 165 | | 118 | 126 | 128 |
| Total organic carbon (mg/l) | 11.7 | | 100.0 | 233 | 62.9 |
| Iron (µg/l) | 460 U | | 298 J | 115u | 102J |
| Manganese (µg/l) | 120 | | 131 | 171 | 176 |
| eVOC Compounds | | | | | |
| cis-1,2-Dichloroethene (µg/l) | 6750 | | 2320 | 1640 | 1500 |
| Trichlorethene (µg/l) | 8250 | | 320 | 207 | 304 |
| Vinyl Chloride (µg/l) | 642 | | 311 | 133 | 96 |
| Total VOCs (µg/l) | 15642 | | 2951 | 1980 | 1900 |
| Comments | Strong TCE odor, moderate turbidity | Slight odor, water opaque, approx one-half of additive remains | Slight odor, water opaque, approx one-half of additive remains | Water is clear and has molasses & TCE odor, very slight effervescence | Water is clear and has molasses & TCE odor, very slight effervescence, approx 5% of additive remains |
| Molar Parent Ratio | 53 | | 11 | 10 | 16 |
| Change in Parent Ratio from Baseline (molar basis) | | | 79.4% | 80.2% | 69.7% |
| Change in Total VOC Concentration from Baseline (mass basis) | | | -81.1% | -87.3% | -87.9% |

Notes:
1. Data collected on April 28, 2008
2. "U" indicates compound was not present above the method detection limit indicated.
3. "J" indicates a result greater than or equal to the method detection limit (MDL), but less than the reporting limit
4. Additives deployed on January 12, 2009. For more information on the additives, refer to the text.
5. Methylene chloride deducted from total VOC value – assumed laboratory artefact
6. Approximately one-half of the original additive volume remain as of the 2/26/209 sampling event.
7. (No Purge) implies the sump was not purged (low flow) prior to the collection of the sample.
8. Purged samples reflect approximately 2.5 gallons purged from sump using low-flow techniques.
9. cVOCs indicates chlorinated volatile organic compounds.

Fig.2

| ANALYTE | Sump 3 Additive: Biostimulant 200 | | | | |
|---|---|---|---|---|---|
| | 11/6/2008 | 2/26/2009 (No Purge) | 2/26/2009 | 4/6/2009 (No Purge) | 4/6/2009 |
| Temperature (°C) | 14.9 | 9.6 | 9.7 | 7.9 | 8 |
| pH | 7.2 | 6.7 | 6.7 | 7.0 | 7 |
| Specific Conductance µS/cm | 860 | 844 | 874 | 1250 | 1250 |
| Dissolved Oxygen Mg/l | 2.90 | 5.2 | 1.08 | 0.00 | 0 |
| eH (mV) | 72 | -245 | -281 | -231 | -250 |
| Methane (µg/l) | 84.2 | Not sampled | 183 | 54.8 | 42.9 |
| Ethane (µg/l) | 7.87 | | 15.7 | 9.26 | 7.34 |
| Ethene (µg/l) | 5.16 | | 37.2 | 14.4 | 10.3 |
| Chloride mg/l | 13.0 | | 16.4 | 12.4 | 12.5 |
| Nitrogen, Nitrate (mg/l) | 0.35 | | 0.050U | 0.050U | 0.050U |
| Sulfate (mg/l) | 145 | | 137 | 172 | 156 |
| Total organic carbon (mg/l) | 11.5 | | 110 | 11.6 | 8.6 |
| Iron (µg/l) | 23 U | | 3060 | 1760 | 2050 |
| Manganese (µg/l) | 153 | | 87.1 | 120 | 121 |
| cVOC Compounds | | | | | |
| cis-1,2-Dichloroethene (µg/l) | 2320 | | 5250 | 2920 | 2870 |
| Trichloroethene (µg/l) | 60300 | | <32 | 101 | 84 |
| Vinyl Chloride (µg/l) | 417 | | 856 | 325 | 345 |
| Total VOCs (µg/l) | 63037 | | 6106 | 3346 | 3299 |
| Comments | Strong TCE odor, moderate turbidity | No odor, water opaque, approx. one half of additive remains | No odor, water opaque, approx one-half of additive remains | Water is clear and has TCE and organic odor, no effervescence | Water is clear and has TCE and organic odor, no effervescence, No additive remains |
| Molar Parent Ratio | 96 | | 0.3 | 3.0 | 2.5 |
| Change in Parent Ratio | | | 99.7% | 96.8% | 97.4% |
| Change in Total VOC Concentration from Baseline | | | -90% | -95% | -95% |

Notes:
1. Data collected on April 28, 2008
2. "U" indicates compound was not present above the method detection limit indicated.
3. "J" indicates a result greater than or equal to the method detection limit (MDL), but less than the reporting limit
4. Additives deployed on January 12, 2009. For more information on the additives, refer to the text.
5. Methylene chloride deducted from total VOC value – assumed laboratory artefact
6. Approximately one-half of the original additive volume remain as of the 2/26/209 sampling event.
7. (No Purge) implies the sump was not purged (low flow) prior to the collection of the sample.
8. Purged samples reflect approximately 2.5 gallons purged from sump using low-flow techniques.
9. cVOCs indicates chlorinated volatile organic compounds.

COMPOSITION FOR ENHANCING ANAEROBIC REDUCTIVE DECHLORINATION BY *DEHALOCCOIDES*

CROSS REFERENCES TO RELATED APPLICATIONS

This application filed under 35 U.S.C. §371 is a national phase application of International Application Serial Number PCT/US2010/036512 tiled May 28, 2010, which claims priority to U.S. Provisional Application 61/182,269, filed May 29, 2009.

PRIORITY

The present invention claims priority to U.S. Provisional Application Ser. No. 61/182,269, flied May 29, 2009, the entirety of which is incorporated herein by reference in its entirety.

FIELD OF THE INVENTION

The present invention relates to bioremediation and, in particular, relates to anaerobic reductive dechlorination.

BACKGROUND OF THE INVENTION

Anaerobic reductive dechlorination is a naturally-occurring process wherein microbes degrade contaminants such as chlorinated volatile organic compounds (VOC) in groundwater. The microbes use organic carbon as an energy source. As they metabolize available organic carbon, the microbes must utilize electron acceptors for respiration. As electron acceptors are depleted, the groundwater environment becomes increasingly reduced electrochemically and the microbes are forced to use successively less-susceptible electron acceptors, ultimately turning to chlorinated VOCs to serve as electron acceptors. *Dehaloccoides* is a genus of microbe known to be capable of using the full suite of common chlorinated VOCs for electron acceptance during respiration.

Existing studies suggest that the most common factors that result in slow or minimal cVOC degradation in groundwater include one or more of the following:
i. Lack of sufficient organic carbon;
ii. Relatively mild Redox conditions (often slightly aerobic); and
iii. Lack of the appropriate bacteria for the specific compounds to be degraded.

Enhanced reductive dechlorination (ERD) is achieved by altering the conditions in the subsurface through injection of biostimulation amendments and/or specialized cultures to overcome the above factors. Successful applications have been extended from common chlorinated compounds such as perchloroethylene (PCE) to perchlorate and even to certain pesticides.

SUMMARY OF THE INVENTION

A method for enhancing anaerobic reductive dechlorination of a contaminated site forms one aspect of the invention. The method comprises the step of enriching the site with organic carbon suitable for use as an energy source by dechlorinating bacteria, nitrogen in the form of urea or ammonia, nutrient phosphorus, matter that releases bio-available hydrogen over a relatively short period of time and relatively quickly following site enrichment, and matter that releases bio-available hydrogen over a relatively long period of time following site enrichment.

According to another aspect of the invention, the site can be enriched using macro and micro nutrients exclusive of those associated with the organic carbon can define a substantial part of the matter that releases bio-available hydrogen over a relatively short period of time and relatively quickly following site enrichment.

According to another aspect of the invention, the site can be enriched using macro and micronutrients including elemental sulfur and potassium oxide.

According to another aspect of the invention, carbon, nitrogen, phosphorus and potassium can be provided as part of the enrichment approximately in the mole ratio 100:10:1:0.1.

According to another aspect of the invention, the site enrichment nutrient phosphorus can be provided at least partly in the form of $P_2O_5$.

According to another aspect of the invention, lactose can define a substantial part of the site enrichment matter that releases bio-available hydrogen over a relatively long period of time following site enrichment.

According to another aspect of the invention, lactose and B-12-fortified brewer's yeast can define substantially all of the site enrichment organic carbon suitable for use as an energy source.

According to another aspect of the invention, the site enrichment can be defined by mass, by about 52% Lactose, about 15.2% B12-fortified Brewer's Yeast, about 12% Sodium Proponate, about 0.8% Sodium carbonate, about 0.12% Nitrate Nitrogen, about 2.1% Ammoniacal Nitrogen, about 3.78% Urea Nitrogen, about 1% Available Phosphoric Acid, about 0.4% Soluble Potash ($K_2O$), about 2% Sulphur (S), about 0.00164% Iron, about 0.0066% Manganese, about 0.0036% Zinc, about 0.00068% Copper, about 0.003% Boron, and about 0.0068% Molybdenum, with the balance being Bio-inactive ingredients.

According to another aspect of the invention, the site can be enriched using organic carbon that can be an organic carbon suitable for use as an energy source by *Dehaloccoides*.

Forming another aspect of the invention is a composition for enhancing anaerobic reductive dechlorination. The composition includes an organic carbon suitable for use as an energy source by dechlorinating bacteria, nitrogen in the form of urea or ammonia, nutrient phosphorus, matter that releases bio-available hydrogen over a relatively short period of time and relatively quickly following hydration, and matter that releases bio-available hydrogen over a relatively long period of time when used as an in situ soil additive.

According to another aspect of the invention, in the composition macro and micro nutrients exclusive of those associated with the organic carbon can define a substantial part of the matter that releases bio-available hydrogen over a relatively short period of time and relatively quickly following hydration.

According to another aspect of the invention, the macro and micronutrients in the composition can comprise elemental sulfur and potassium oxide.

According to another aspect of the invention, carbon, nitrogen, phosphorus and potassium can be provided in the composition approximately in the mole ratio 100:10:1:0.1.

According to another aspect of the invention, the nutrient phosphorus can be provided in the composition at least partly in the form of $P_2O_5$.

According to another aspect of the invention, lactose can define a substantial part of the matter in the composition that releases bio-available hydrogen over a relatively long period of time when used as an in situ soil additive.

According to another aspect of the invention, lactose and vitamin B-12-fortified brewer's yeast can define substantially all of the carbon in the composition suitable for use as an energy source by *Dehaloccoides*

According to another aspect of the invention, the composition can comprise by mass, about 52% Lactose, about 15.2% B12-fortified Brewer's Yeast, about 12% Sodium Proponate, about 0.8% Sodium carbonate, about 0.12% Nitrate Nitrogen, about 2.1% Ammoniacal Nitrogen, about 3.78% Urea Nitrogen, about 1% Available Phosphoric Acid, about 9.4% Soluble Potash ($K_2O$), about 2% Sulphur (S), about 0.00164% Iron, about 0.0066% Manganese, about 0.0036% Zinc, about 0.00068% Copper, about 0.003% Boron, and about 0.0068% Molybdenum, with the balance being Bio-inactive ingredients.

According to another aspect of the invention, the organic carbon in the composition can be organic carbon suitable for use as an energy source by *Dehaloccoides*.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 1 is a table showing a pilot study in which a passive release device containing a hydrogen releasing compound was deployed in a sump well;

FIG. 2 is a table showing a pilot study in which a passive release device containing an electron donor compound Was deployed in a sump well; and FIG. 3 is a table showing a pilot study in which a passive release device containing a BioNutrient was deployed in a sump well.

DETAILED DESCRIPTION

The present invention relates to bioremediation and, in particular, relates to anaerobic reductive dechlorination. Persons of ordinary skill in the art will gain an understanding of the present invention on review of the following case studies.

Three sump wells were drilled on a contaminated site, and groundwater sampling was performed on Nov. 6, 2008 and Jan. 2, 2009 for the following parameters to establish baseline biogeochemical conditions, e.g., chlorinated volatile organic compounds (cVOCs), nitrate, dissolved Iron and Manganese, sulfate, methane, ethene & ethane, chloride, and field parameters, e.g., dissolved oxygen (DO), oxidation-reduction potential (ORP), pH, specific conductance, and temperature.

Groundwater samples were collected from sump wells without purging for laboratory analysis. An aliquot of each sample was analyzed in the field for DO, ORP, pH, specific conductance, and temperature using parameter-specific electrodes.

On Jan. 12, 2009, following baseline sampling, three Passive Release Devices (PRDs) containing three different proprietary remedial additive formulations were installed in each sump well.

The PRDs installed in these sump wells contained the following additive formulations:
i) Sump Well 1—Hydrogen Releasing Compound (HRC-X®) manufactured by Regenesis Bioremediation Products of San Clemente, Calif., United States. HRC-X is a glycerol tripolylactate.
ii) Sump Well 2—Electron Donor Compound®, (EDC®) manufactured by EcoCycle Corporation of Toyama, Japan. EDC is composed of 65% Lactose, 19% yeast extract, 15% sodium propionate, 1% sodium carbonate and 2 g of cobalt chloride per 15 Kg of EDC.
iii) Sump Well 3—EDC®+BioNutrient200® ($EDC_{IN}$) manufactured by Plant Products Co Ltd of Brampton, Ontario, Canada. The specifications of BioNutrient200 are as follows: Bioactive ingredients Include 30% Total Nitrogen, 0.6% Nitrate Nitrogen, 10.5% Ammoniacal Nitrogen, 18.9% Urea Nitrogen, 5% Available Phosphoric Acid, 2% Soluble Potash ($K_2O$), 10% Sulphur (S), 0.082% Iron, 0.033% Manganese, 0.018% Zinc, 0.0034% Copper, 0.015% Boron, and 0.0034% Molybdenum, with the remining balance containing Bio-inactive ingredients.

The PRDs deployed in Sump Well 1 each consisted of a threaded, 5-feet long, 2-inch outer diameter PVC well screen (0.006 inch slot size), which were threaded together, secured at the bottom, and covered in a filter fabric to slowly release the HRC-X® into the well bore over the pilot study duration. Each PRD deployed in Sump Well 1 contained about 2.33 pounds of HRC-X®, for a total of about 4.66 pounds of additive.

The PRDs deployed in Sump Well 2 each consisted of a 5-feet long, 2-inch outer diameter filter fabric "sock", secured at the bottom, to slowly release EDC® into the well or over the pilot study duration. Each PRD deployed in Sump Well 2 contained about 2.33 pounds of EDC®, for a total of about 4.66 pounds of additive.

The PRDs deployed in Sump Well 3 each consisted of a 5-feet long, 2-inch outer diameter filter fabric "sock", secured at the bottom, to slowly release $EDC_{IN}$ into the well bore over the pilot study duration. Each PRD deployed in Sump Well 3 contained about 2.33 pounds of EDC® and about 0.58 pounds of BioNutrient200®.

The filter fabric "socks" deployed in Sump Wells 2 and 3 each included about 1.0 pound of clean filter said at the bottom of the PRD to provide negative ballast to sink the PRD in the well bore during deployment.

Following PRD deployment, two rounds of no purge and low-flow performrice monitoring of each of the pilot study sump wells were performed on Feb. 26, 2009 and Apr. 6, 2009, respectively, for the same parameters collected during the Nov. 6, 2008 and Jan. 2, 2009 baseline samplings.

Comparative Pilot Study results for the three sump wells into which PRDs were deployed are summarized in attached FIGS. 1-3, Entitled "Summary of ERD Assessment Parameters".

The pertinent results are discussed below, first for the indicator parameters and then for the cVOCs. It is noted that the Pilot Study performance evaluation focuses on no purge results since PRDs contain minimum additive loading that yield very limited radii of influence at deployment locations.

Indicator Parameters

All three remedial additives drove the groundwater system increasingly anaerobic and chemically reducing, achieving the Redox conditions required for ERD. For example, the final DO and ORP values for HRC-X®, EDC®, and $ERD_{IN}$ were 0.5 milligrams per liter (mg/L) DO and −159 millivolts (mV), 0.2 mg/L DO and −200 mV, and 0.0 mg/L and −231 mV, respectively.

Nitrate was detected below the analytical reporting limit (RL) at the HRC-X® location throughout the study. At the EDC® location, there was no significant change in nitrate concentration. At the $EDC_{IN}$ location, there was a one order of magnitude decrease in nitrate concentration over the pilot study duration, which is consistent with an enhanced non-assimilatory nitrate reduction pathway, driven by $EDC_{IN}$.

There was no significant overall change in dissolved iron and manganese concentrations for either the HRC-X® or EDC® locations, or relative to the manganese concentration for the $EDC_{IN}$ location. There was, however, a two order of magnitude increase in dissolved iron concentration for the $EDC_{IN}$ location. The increased dissolved iron concentration at this location suggests that $EDC_{IN}$ enhanced iron reduction.

There was no significant change in sulfate concentration at any of the sump wells into which the three additives were deployed.

There was an overall reduction in methane concentrations at the sump wells at which either EDC® or $EDC_{IN}$ were amended. The concentration, however, was ostensibly stable at the HRC-X® location. Because methane production suggests that methanogenesis has been stimulated, in competition for hydrogen with dehalorespiration, the fact that methane was not produced above analytical RLs suggests that hydrogen, produced during fermentation reactions associated with the additives, was not lost on methanogenesis.

There was an overall decrease in ethene concentrations at the HRC-X® and EDC® locations, but between a 179% increase and a 621% increase at the $EDC_{IN}$ location. The increased ethene concentration at the $EDC_{IN}$ location, relative to the other locations, suggests that this additive formulation was the most effective in enhancing cVOC dechlorination, as ethene is a gas at standard temperatures and pressures, and the primary pathway for yielding dissolved ethene in groundwater is the dehalorespiration of cVOCs. Importantly, the fact ethene was detected above analytical RLs in baseline groundwater quality samples collected from these sump wells suggests that bacteria of the genus *Dehaloccoides* are present in the groundwater system, as bacteria of that genus are the only known microflora to drive dechlorination to yield ethene as a degradation product.

There was no significant overall change in ethane concentrations at the HRC-X® location (noting a small (10%) increase for the final sampling round relative to baseline). Concentrations, however, generally decreased at the EDC® location. Relative to the $EDC_{IN}$ location, while overall concentrations remained generally stable, there was a single spiked increase (99%) immediately following $EDC_{IN}$ amendment, which is consistent with an ERD pathway driven by additive amendment.

Chloride concentrations remained generally stable or decreased somewhat for the groundwater samples collected from the HRC-X® and EDC® locations. Relative to the $EDC_{IN}$ location, while overall concentrations remained stable, there was a single spiked 26% increase in chloride concentrations immediately following $EDC_{IN}$ amendment, which is consistent with an ERD pathway yielding chloride as a degradation product.

The HRC-X® location had the lowest baseline DO concentration for the study (0.0 mg/L DO relative to 3.8 mg/L and 2.9 mg/L for the EDC® and $EDC_{IN}$ locations, respectively). The HRC-X® location also had a lower baseline ORP value (−74 mV) than the ORP value (+72 mV) from the $EDC_{IN}$ location. The fact that HRC-X® was deployed in the well with the lowest baseline DO concentrations, suggests that the performance results for that location are likely optimistic relative to the other two additives, which had to overcome more recalcitrant baseline conditions before dechlorination could proceed.

cVOCs

Relative to cis-1,2-Dichloroethene (c-DCE) concentrations, the preferred daughter DCE isomer of Trichloroethene (TCE) dechlorination, an overall 76 percent reduction ($\%_{Reduction}$) for the EDC® location was observed relative to a $30\%_{Reduction}$ for the HRC-X® location. With respect to the $EDC_{IN}$ location, there was an overall 26% increase and an initial 126% increase in c-DCE concentration. It must be noted that the sump well at which $EDC_{IN}$ was amended had the highest baseline TCE concentration by at least about a factor of four. Therefore, the c-DCE results for the $EDC_{IN}$ location are encouraging.

Relative to TCE—the primary cVOC of concern for the study—overall reduction in TCE concentration for the HRC-X®, EDC®, and $EDC_{IN}$ locations were $99.9\%_{Reduction}$, $97.5\%_{Reduction}$, and $99.8\%_{Reduction}$, respectively, Once again, it must be noted that the $EDC_{IN}$ location had the highest baseline TCE concentration by at least about a factor of four, i.e., at concentrations indicative of the presence of TCE source mass. Therefore, the TCE results for $EDC_{IN}$ are highly encouraging.

Relative to Vinyl Chloride (VC), which is the ultimate cVOC daughter product of chlorinated alkene ERD, the overall reductions in concentrations ranged from $22\%_{Reduction}$ ($EDC_{IN}$ location) to $79\%_{Reduction}$ (EDC® location), with a more intermediate $36\%_{Reduction}$ for the HRC-X® location. As indicated previously, the $EDC_{IN}$ location had the highest baseline TCE concentration by at least about a factor of four. Therefore, the VC results for the $EDC_{IN}$ location are highly encouraging. Significantly, there was no overall increase in VC concentration for samples collected from any of the sump wells during the pilot study.

Relative to Molar Parent Ratios, i.e, ratio of parent cVOCs to parent+daughter cVOCs, on a molar basis to normalize data, overall reductions ranged from $80.2\%_{Reduction}$ (EDC® location) to $99.7\%_{Reduction}$ (HRC-X® location), with an intermediate $96.8\%_{Reduction}$ for the $EDC_{IN}$ location. Given the nearly identical performance for the HRC-X® and $EDC_{IN}$ locations, especially in view of the significantly greater baseline TCE concentration at the $EDC_{IN}$ location, the $96.8\%_{Reduction}$ in Molar Parent Ratio for this location suggests that $EDC_{IN}$ was highly effective in dechlorinating TCE source mass.

Relative to Total cVOCs, overall reductions ranged from $69\%_{Reduction}$ (HRC-X® location) to $95\%_{Reduction}$ ($EDC_{IN}$ location), with an intermediate $87\%_{Reduction}$ for the EDC® location. Given the greatest % reduction for the $EDC_{IN}$ location, especially in view of the significantly greater baseline TCE concentration, the $95\%_{Redection}$ in Total cVOCs for the $EDC_{IN}$ location suggests that this additive formulation was highly effective in declorinating cVOCs, noting that a bulk percentage of baseline cVOCs reflected the parent specie TCE.

Conclusions

Overall, the results demonstrate that additive amendments were successful in enhancing cVOC reductive dechlorination at the three sump well locations. Significantly, the overall reduction in TCE concentration for the HRC-X®, EDC® and $EDC_{IN}$ locations was respectively $99.9\%_{Reduction}$, $97\%_{Reduction}$ and $99.8\%_{Reduction}$. This suggests that each of the three additives was highly effective in source mass dechlorination. However, given the baseline TCE concentration for the $EDC_{IN}$ location was about four-fold greater than the others, $EDC_{IN}$ appears to have the strongest performance characteristics of the three ERD additives pilot tested at the site.

The following results provide collaborating lines of evidence for this conclusion:

i) $EDC_{IN}$ appears to have been the only additive to enhance non-assimilatory nitrate reduction as well as oxidized iron/manganese reduction. Redox conditions generally must decrease below nitrate and iron/manganese reduction for dechlorination to be effective;

ii) The $EDC_{IN}$ additive formulation appears to have been the only one that resulted in etnene production, i.e., up to 621%$_{Increase}$. Given that ethene is a demonstrated daughter product of cVOC dechlorination, its production at the $EDC_{IN}$ location is consistent with an effective additive for destroying TCE source mass;

iii) The $EDC_{IN}$ additive formulation appears to have been the only additive that resulted in chloride production, i.e., initial 26%$_{Increase}$. Given that chloride is a demonstrated dechlorination product of cVOCs, its production at the $EDC_{IN}$ location is consistent with an effective additive for destroying source mass;

iv) The $EDC_{IN}$ additive formulation appears to have resulted in the greatest overall reduction in Total cVOCs, i.e., 95%$_{Reduction}$ for $EDC_{IN}$ relative to a 69%$_{Reduction}$ for HRC-X® and an 87%$_{Reduction}$ for EDC®; and v) Given each PRD contained residual additive during the final sampling round, with the singular exception of the $EDC_{IN}$ location, the performance results for the $EDC_{IN}$ location are considered conservative.

Without intending to be bound by theory, the advantageous results are believed to flow from the timely presence of bio-available hydrogen and nutrients. An abundance of free hydrogen immediately following hydration, generated in large part by the micro and macro nutrients, is believed to help reduce available electron acceptors in the soil and groundwater. The micro and macro nutrients and carbon additives cause bacterial blooms that, through respiration, remove additional electron acceptors from the environment. In totality, the soil chemistry is believed to be driven quickly towards conditions amenable to cVOC respiration. At the same time, abundant hydrogen remains bio-available once cVOC respiration becomes a primary reaction, and continues to he released over time, during fermentation of the lactose, which itself is hydrogen rich. As hydrogen is required by *Dehaloccoides*, these conditions promote growth and activity of *Dehaloccoides*, and consequent cVOC destruction.

From the above description of the invention, those skilled in the art will perceive improvements, changes, and modifications. Such improvements, changes, and modifications within the skill of the art are intended to be covered by the appended claims.

Having described the invention, the following is claimed:

1. A method for enhancing anaerobic reductive dechlorination of a contaminated site, comprising a step of applying a solid chemical composition to the contaminated site, wherein the solid chemical composition comprises, by mass: about 52% Lactose, about 15.2% B12-fortified Brewer's Yeast, about 12% Sodium Proponate, about 0.8% Sodium carbonate, about 0.12% Nitrate Nitrogen, about 2.1% Ammoniacal Nitrogen, about 3.78% Urea Nitrogen, about 1% Available Phosphoric Acid, about 0.4% Soluble Potash ($K_2O$), about 2% Sulphur (S), about 0.00164% iron, about 0.0066% Manganese, about 0.0036% Zinc, about 0.00068% Copper, about 0.003% Boron, and about 0.0068% Molybdenum, with the balance being bio-inactive ingredients.

2. A solid chemical composition for enhancing anaerobic reductive dechlorination, the solid chemical composition comprising, by mass: about 52% Lactose, about 15.2% B12-fortified Brewer's Yeast, about 12% Sodium Proponate, about 0.8% Sodium carbonate, about 0.12% Nitrate Nitrogen, about 2.1% Ammoniacal Nitrogen, about 3.78% Urea Nitrogen, about 1% Available Phosphoric Acid, about 0.4% Soluble Potash ($K_2O$), about 2% Sulphur (S), about 0.00164% iron, about 0.0066% Manganese, about 0.0036% Zinc, about 0.00068% Copper, about 0.003% Boron, and about 0.0068% Molybdenum, with the balance being bio-inactive ingredients.

* * * * *